No. 713,345. Patented Nov. 11, 1902.
G. PORTER.
OIL HEATING AND HEAT REGULATING DEVICE.
(Application filed Feb. 20, 1902.)
(No Model.)
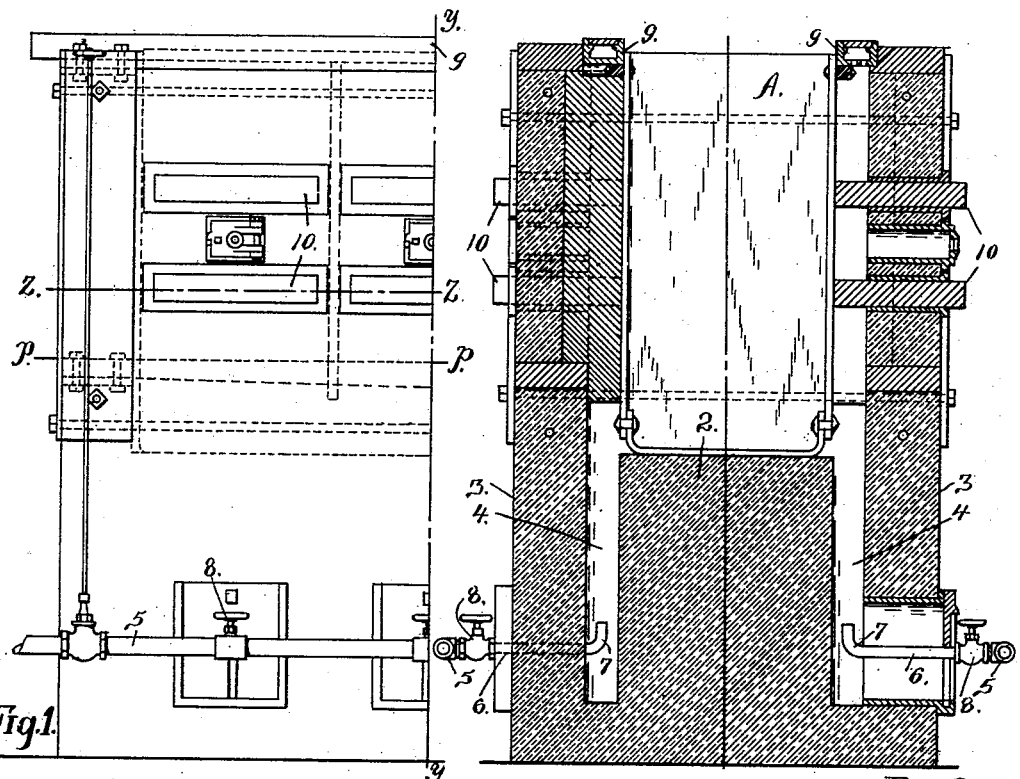
Fig.1.
Fig.2.
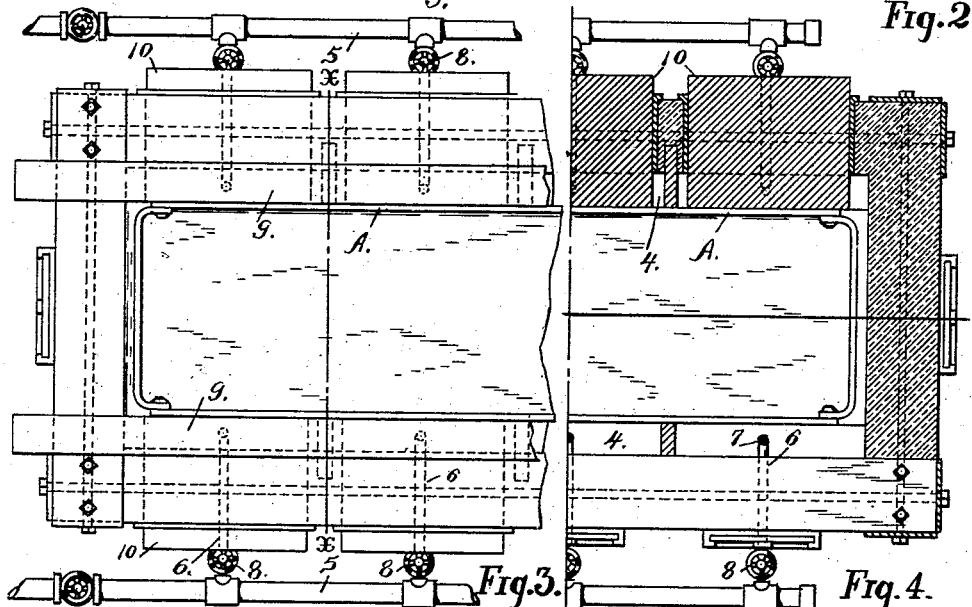
Fig.3.
Fig.4.

UNITED STATES PATENT OFFICE.

GEORGE PORTER, OF SAN FRANCISCO, CALIFORNIA.

OIL HEATING AND HEAT-REGULATING DEVICE.

SPECIFICATION forming part of Letters Patent No. 713,345, dated November 11, 1902.

Application filed February 20, 1902. Serial No. 94,936. (No model.)

*To all whom it may concern:*

Be it known that I, GEORGE PORTER, a citizen of the United States, residing in the city and county of San Francisco, State of California, have invented an Improvement in Oil Heating and Heat-Regulating Devices; and I hereby declare the following to be a full, clear, and exact description of the same.

My invention relates to an apparatus for applying the heat derived from the combustion of oil to galvanizing or metal-coating tanks and in a means for regulating the application.

It consists of the parts and the constructions and combinations of parts hereinafter described and claimed.

Figure 1 is an elevation of a part of a furnace embodying my invention. Fig. 2 is a cross-sectional view of the furnace on the line $x\ x$ of Fig. 3. Fig. 3 is a top plan view. Fig. 4 is a horizontal section on the line $z\ z$ of Fig. 1.

For the purpose of galvanizing or coating metals with zinc or like metal a tank A is employed, in which the zinc or other coating metal is melted. This tank is generally made of iron, rectangular in shape, having a flat bottom, and this bottom is supported upon a fire-brick or masonry structure 2, upon which it rests and which prevents the tank being bent or destroyed by the great weight of metal which it contains when full. Such a tank may be made twelve feet or upward in length by two feet in width and four feet in depth. It is inclosed by walls 3, made of fire-brick or other suitable material, and these walls are built so that there is a channel 4 left between them and the sides of the tank and also of the central brick support 2 upon which it rests. On each side and exterior to the walls of the furnace are the main oil-supply pipes 5, properly supported parallel to the side walls and near the bottom thereof. From these pipes branch burner-pipes 6 extend inwardly and have their ends upturned, as at 7, within the open channels which form the furnace. These supply-pipes have controlling-cocks at 8, and they enter the furnace-chamber upon each side and at any suitable intervals.

In constructing the furnace I employ stout iron knees, which inclose the sides of the tank, practically filling the space between the interior walls of the structure and the sides of the tank, and these knees retain the shape of the tank and prevent it from being bulged by the weight of metal within it. At the same time they form partitions at intervals, and between these knees the oil-jets are introduced, so that each jet practically heats the space between the two adjacent knees. When the space on each side of the tank is open, the flame from the oil-jets extending upwardly on each side of the tank will melt the contents of the tank and retain the metal in a molten condition.

The tops of the heat-channels of the furnace are closed by pipes, as at 9, which extend along each side, closing the space between the top of the tank and the top of the furnace-walls, and these pipes have openings into them from below which receive the gas and unconsumed products of combustion and convey them away. The pipes also by closing the furnace enable the workmen to have access to the open top of the tank without being exposed to the heat from the surrounding furnace.

When small articles, such as nails, are to be galvanized, they are usually placed in baskets and plunged into the tank sufficiently to submerge them, after which they are removed, and when larger articles are to be thus coated it is frequently necessary to submerge them to the bottom of the tank. These masses of cold iron introduced into the tank make it difficult to keep the metal in a molten condition at all parts of the tank, and in order to control the heat and direct it to those parts where it is most necessary I have shown a series of horizontally-slidable gates or tiles 10, fitting into properly-constructed openings in the furnace-walls and adapted to be withdrawn sufficiently to leave the whole of the channels on each side of the tank open from top to bottom or to close off portions of the channels, and thus limit the heat. Thus when nails are being galvanized it is desirable to have the metal at the top of the tank fully heated, and these gates are then opened, so that the flame can pass all the way up on each side of the tank and heat the metal from top to bottom.

When large articles such as have to be plunged to the bottom of the tank are to be galvanized, it is desirable to confine the heat and apply it more particularly to the lower part of the tank, and this is effected by closing any series of the gates 10. Thus by closing all of them the heat will be confined around the lower part of the tank. By opening the lower series it will be allowed to extend up about half-way and by opening all of them it can extend to the top.

The spaces formed where the knees which support the tank are placed provide a sufficient escape for gases and products of combustion when the gates are closed, these spaces being intermediate between the adjacent edges of each set of gates.

The gates may be made of any suitable material. I prefer to form them of heat-resisting tiles, which are preferably set into iron frames, the frames sliding in guides in the masonry or brickwork and being thus protected from too intense heat.

I have shown vertically-sliding doors at points where each of the branch burner-pipes enter. These doors may have the lower part slotted, so that they can be raised or lowered for the pipes which enter through these slots, and the slots will admit sufficient air for proper combustion of the oil, or other air-admitting gates or dampers may be employed, as may be found desirable.

While heretofore described as rectangular, it will be manifest that the tank or container may be made round or of any other shape suitable for the character of the work to be done, the essential features being preserved. The conductors 9 for the products of combustion serve in any case to protect the workmen from the escaping gases and enable them to reach the interior of the tank. The escape-opening or chimney connection may also be disposed to suit convenience.

Having thus described my invention, what I claim, and desire to secure by Letters Patent, is—

1. In an apparatus for melting metal, a tank having a flat-bottom masonry support and transverse supporting and inclosing knees for the tank, furnace-walls built parallel with the tank and its support and forming channels upon each side, oil-supply pipes exterior to the walls, openings through the walls and branch pipes extending through said openings and upturned within the open channels intermediate of the supporting-knees, slidable gates fitting the openings in the walls and adjustable to regulate the air-supply to promote combustion, and means for independently regulating the supply of oil to the furnace.

2. An apparatus for melting metals, consisting of an open-topped flat-bottomed tank with a masonry support upon which it rests, furnace-walls forming channels upon each side of said tank and its support, oil-supply pipes and burners disposed within said channels, said furnace-walls having openings horizontally through them, and horizontally-slidable gates fitting said openings and slidable therethrough, and having their inner ends to abut against the outer walls of the tank whereby the vertical depths of the channels and the application of heat to the melting-tank may be regulated.

3. An apparatus for melting metals consisting of an open-topped flat-bottomed tank, a masonry support upon which it rests, furnace-walls built to form vertical channels upon each side of the tank and its support, exterior oil-supply pipes and branch burner-pipes extending therefrom into the heating-channels, said furnace-walls having openings longitudinally through them, metal frames in said openings, gates slidable horizontally in the frames so that their inner portions may extend horizontally across the vertical channels and abut endwise against the outer walls of the tank, by which any portion of the heating-space may be cut off or limited, and rectangular pipes forming a closure between the top of the furnace-walls and the top of the tank, said pipes having passages communicating with the heat-channels whereby gases and products of combustion are conveyed away and prevented from rising above the edge of the tank.

4. In an apparatus for melting metals, the combination of a centrally-disposed melting-tank; a wall surrounding the same and forming a channel between itself and the tank, said wall having openings horizontally through it; a hollow conductor forming a closure for the top of the channel and having openings in its under side connecting with said channel; and valves or gates mounted in said openings in the wall, slidable horizontally across the channel and having their inner ends adapted to abut endwise against the outer wall of the tank.

In witness whereof I have hereunto set my hand.

GEORGE PORTER.

Witnesses:
S. H. NOURSE,
H. F. ASCHECK.